US010722071B2

(12) United States Patent
De' Longhi et al.

(10) Patent No.: US 10,722,071 B2
(45) Date of Patent: Jul. 28, 2020

(54) AUTONOMOUS APPARATUS FOR COOKING FOOD

(71) Applicant: DE' LONGHI APPLIANCES S.R.L. CON UNICO SOCIO, Treviso (IT)

(72) Inventors: Giuseppe De' Longhi, Treviso (IT); Gianpaolo Trevisan, San Martino Buon Albergo (IT); Renzo Mazzon, Silea (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 248 days.

(21) Appl. No.: 15/777,297

(22) PCT Filed: Nov. 18, 2016

(86) PCT No.: PCT/IB2016/056947
§ 371 (c)(1),
(2) Date: May 18, 2018

(87) PCT Pub. No.: WO2017/085673
PCT Pub. Date: May 26, 2017

(65) Prior Publication Data
US 2018/0325313 A1    Nov. 15, 2018

(30) Foreign Application Priority Data

Nov. 19, 2015    (IT) .................... 102015000074506

(51) Int. Cl.
*A47J 27/08* (2006.01)
*A47J 37/06* (2006.01)
(Continued)

(52) U.S. Cl.
CPC ......... *A47J 37/0641* (2013.01); *A47J 43/046* (2013.01); *A47J 27/004* (2013.01)

(58) Field of Classification Search
CPC .... A47J 37/0641; A47J 43/046; A47J 27/004; A47J 37/0629; A47J 27/043; A47J 27/08;
(Continued)

(56) References Cited

U.S. PATENT DOCUMENTS 3,677,170 A * 7/1972 Shelton ............... A47J 27/0817
99/337
5,092,229 A * 3/1992 Chen .................... A47J 27/0811
126/348

(Continued)

FOREIGN PATENT DOCUMENTS

| CN | 102499572 A | 6/2012 |
| WO | 2006000700 A2 | 1/2006 |

OTHER PUBLICATIONS

Int'l Search Report and Written Opinion dated Mar. 3, 2017 in Int'l Application No. PCT/IB2016/056947.

*Primary Examiner* — Jun S Yoo
(74) *Attorney, Agent, or Firm* — Panitch Schwarze Belisario & Nadel LLP

(57) ABSTRACT

An Autonomous apparatus for cooking food having a base body (14) with a main heating element (18), a lid (15) which can be associated with the base body (14) in at least two positions and inside which a secondary heating element (19) is installed and possible heat transfer and/or ventilation means (20), and a mixing device (28). The base body (14) supports and positions one of a removable container (11), said lid (15), and/or said container (11), in correspondence with a respective coupling edge, comprising at least an airtight packing (21) to define a cooking chamber (16) with a desired steam pressure. Said lid (15) has a single size with airtight packings (21) suitable to cooperate with different sizes of the container (11) and/or of one container (11) having different heights with respect to said base body (14).

10 Claims, 1 Drawing Sheet

(51) Int. Cl.
*A47J 43/046* (2006.01)
*A47J 27/00* (2006.01)

(58) Field of Classification Search
CPC .... A47J 27/0817; A47J 27/082; A47J 27/084; A47J 27/086; A47J 27/092; A47J 27/14
See application file for complete search history.

(56) References Cited

U.S. PATENT DOCUMENTS

| | | | |
|---|---|---|---|
| 5,590,583 A * | 1/1997 | Harrison | A47J 37/0623 99/327 |
| 2005/0223906 A1 | 10/2005 | Xu et al. | |
| 2008/0257168 A1 * | 10/2008 | Wolfe | A47J 36/165 99/348 |

* cited by examiner

AUTONOMOUS APPARATUS FOR COOKING FOOD

CROSS-REFERENCE TO RELATED APPLICATION

This application is a Section 371 of International Application No. PCT/IB32016/056947, filed Nov. 18, 2016, which was published in the English language on May 26, 2017 under International Publication No. WO 2017/085673 A1, which claims priority under 35 U.S.C. § 119 to Italian Patent Application No. 102015000074506, filed on Nov. 19, 2015, and the disclosures of which are incorporated herein by reference.

FIELD OF THE INVENTION

The present invention concerns an autonomous apparatus able to cooperate with a food container and to carry out with it a cooking process through heating.

The apparatus cooks the food, reproducing in it the normal mixing process that the chef carries out manually, using a mixing device.

The apparatus according to the invention provides a closing lid, and there are also heat energy production elements and possible means to transfer the heat energy to the food.

BACKGROUND OF THE INVENTION

It is known that autonomous cooking apparatuses exist in the home, comprising a support body and a container that can be selectively inserted into and removed from the support body.

Types of cooking apparatuses are known, which have an integrated mixing device, possibly replaceable by other tools, for example shredders or mincers, and heating means associable both with the lower part, or base, and also with the upper part, or lid, of the container, and possibly ventilation or heat transfer means, also associable with the lid, able to perform a wide range of recipes autonomously, that is, eliminating human intervention as much as possible.

It is also known that autonomous cooking apparatuses of this type, also indicated by the term "dry fryer", are very versatile as they allow to obtain a plurality of recipes according to the type of food, the combination of the foods and the particular cooking modes adopted.

For example, the different cooking modes, also programmable, that can be performed by this type of cooking apparatus are stews, roasts, dry frying, simple reheating, sautéed dishes, browning, or rapid cooking in general.

However, due to their structure and functioning principle, known cooking apparatuses of this type are not generally conceived to also perform steam cooking or boiling in general.

The patent application US-A-2005/223906 describes an autonomous apparatus for cooking food comprising a base body provided with a main heating device, a lid, provided with a secondary heating element, and a mixing device. The lid is associated with the base body and the base body houses a removable container. Furthermore, in correspondence with a coupling edge, the lid or the container has at least one sealing packing to define a cooking chamber.

U.S. Pat. No. 5,590,583 and CN 102 499 572 describe other state-of-the-art cooking apparatuses.

Other types of cooking apparatuses exist, with different conception and functions, which do not provide mixing devices cooperating with heat transfer means and/or heating elements installed in the lid and which therefore are not able to perform oven cooking or dry frying, or roasts or suchlike. For example, apparatuses of this known type like multi-cookers are only able to perform steam cooking, boiling or suchlike.

As indicated above, the cooking apparatus provides a removable container and a lid which, when closed, creates the environment suitable to obtain the cooking chamber.

However, cooking apparatuses of the dry fryer type do not guarantee an effective seal of the steam and humidity, even with the lid in the closed position on the container.

Furthermore, when in known apparatuses a certain seal is obtained with the lid closed, there is a risk of an excessive increase in pressure inside the container.

One purpose of the present invention is to obtain an autonomous apparatus for cooking food able to extend the range of types of cooking performable compared with known cooking apparatuses of the same type.

Another purpose is to obtain an autonomous apparatus for cooking food able to allow to prevent increases in pressure inside the container to determine safe cooking conditions.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an autonomous apparatus for cooking food able to carry out, as well as the types of cooking known in apparatuses of the same type, also cooking by steam.

According to one aspect of the invention, the apparatus comprises a base body with a main heating element, a covering element or lid which can be associated with the base body and inside which a secondary heating element is installed and possible heat transfer and/or air movement means, a container selectively removable from the base body and a motorized mixing device.

Moreover, the lid provides a secondary heating element that cooperates with the transfer means. In the context of the present invention, the container can be replaced by others having different sizes, with regard to height and/or base sizes.

It is within the spirit of the invention that the lid is made to comprise and cooperate correctly with all the sizes of the container, that is, it can be easily removed and replaced by disconnecting and reconnecting the new lid to the apparatus simply, so as to have sizes correlated to the container operating at that moment.

According to the invention, the cooking apparatus is configured to operate both for conventional cooking, for example operating as a dry fryer with only a small quantity of oil or other suitable cooking agent, and also to operate by cooking with steam, after having inserted a certain quantity of water that is then transformed into steam.

For this purpose, in accordance with a first aspect of the present invention, the lid and/or the container, in correspondence with the respective coupling edges cooperating with the lid in the closed position, comprise at least one airtight packing.

If the lid is suitable to serve more than one horizontal size of the container, the lid can, in a variant of the invention, have as many airtight elements with specific packings as there are horizontal sizes of the container provided.

In the closed position the container and the lid thus define a cooking chamber able to be taken to the maximum pressure allowed without large quantities of steam exiting.

According to a variant embodiment, the lid and/or the container comprise a selectively controllable pressure discharge device that allows to control the pressure and the quantity of steam inside the container.

Moreover, according to a variant embodiment, the pressure discharge device selectively determines whether the steams exits from or remains inside the cooking chamber, cooperating with a pressure measurer and controller.

According to a variant embodiment, the container has food support means inside it, to keep the food distanced from the base of the container, and possibly from the maximum level of the water, at least during the steam cooking step, facilitating the transformation of the water into steam and enabling the steam to fall, also partly in the form of condensation, onto the food.

In a variant embodiment, the lid can have an internal volume divided into two separate portions and insulated from each other, an upper portion to house the motor and a lower portion to house the heating and/or transfer/ventilation elements.

In another variant embodiment, the lid can comprise at least a second airtight packing disposed in correspondence with an upper part in order to determine an airtight pressure in correspondence with an aperture associated at least with a drive member, which drives the transfer means, in order to cool the drive member.

According to another variant embodiment, the mixing device is made to rotate by a drive member located in the lid.

According to another variant embodiment, the mixing device cooperates with a drive member present in the apparatus.

The present invention also provides a steam cooking method using the autonomous apparatus for cooking food.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
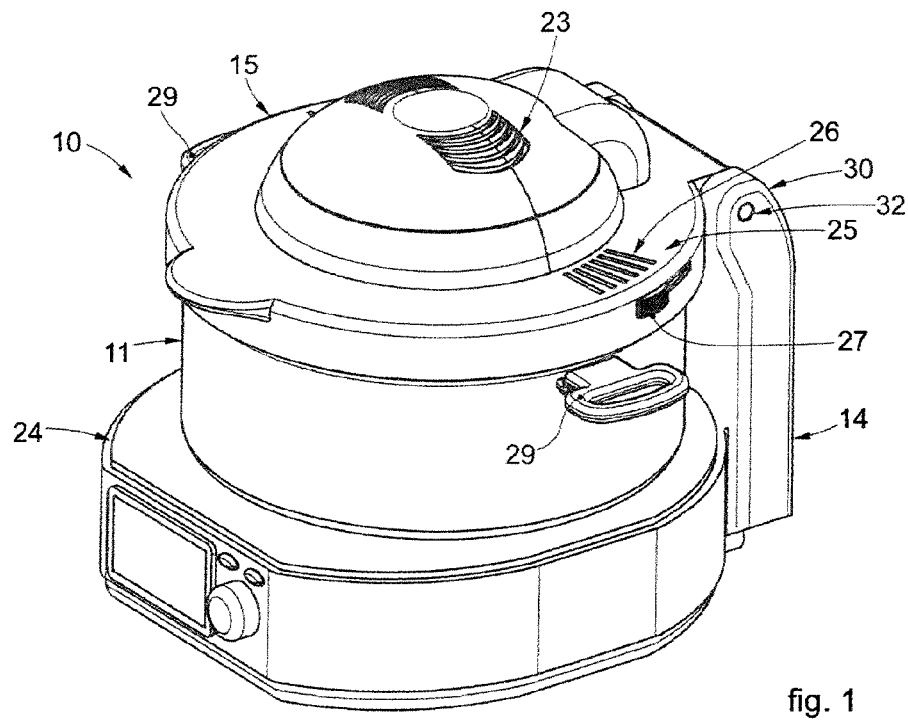
FIG. 1 is a perspective view of an autonomous apparatus for cooking food.
Figure 2:
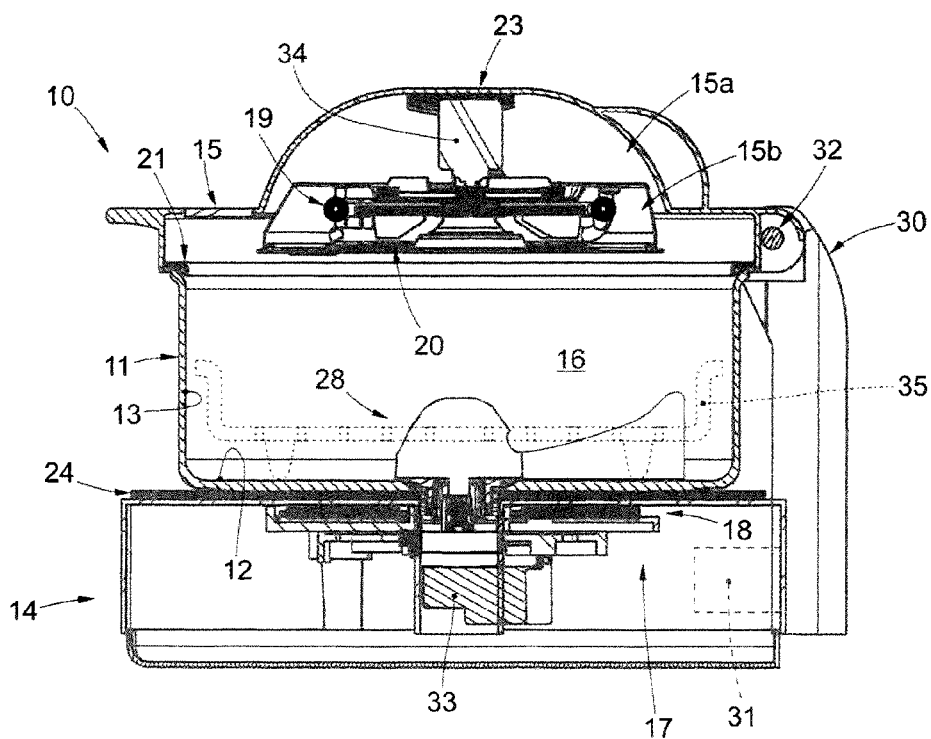
FIG. 2 is a section view of the autonomous apparatus for cooking food.

FIGS. 1 and 2 are used to describe embodiments of an apparatus 10 for cooking food.

In particular, the apparatus 10 is designed to perform, together with the container 11, not only frying but also any type of cooking that includes the use of a higher or lower quantity of fat or steam. In particular, the apparatus 10 is indicated for so-called dry frying, that is, using a minimum quantity of fat.

The apparatus 10 comprises a base body 14 with a support plane 24, a lid 15 connected to the base body 14 by a bracket 30 that allows it to be positioned open or closed, and a motorized mixing device 28.

The internal compartment that is created when the container 11 cooperates directly with the lid 15 defines a cooking chamber 16.

The container 11, which is the type that can be removed from the base body 14, consists of a base 12 and a lateral wall 13, it is open at the top and able to contain the food and the possible cooking liquid, the base 12 being suitable to cooperate with the base body 14.

The container 11 is part of a range of containers of different sizes all associable with the base body 14.

According to another variant embodiment, the container 11 can be housed inside an external covering body of the apparatus 10.

In the case of steam cooking the liquid used is water.

To perform this type of cooking, alternative and additional to the conventional function of dry cooking with a reduced quantity of fat, the invention provides that the coupling edge of the lid 15 and/or the coupling edge of the container 11 are equipped with at least an airtight packing 21.

In the closed position, a desired pressure is thus obtained of the steam inside the cooking chamber 16.

The airtight packing 21 is suitably configured to closely adhere to the upper edge of the lateral wall 13 of the container 11 when the lid 15 is in the closed position.

The airtight packing 21 is also associated with the upper edge of the lateral wall 13 of the container 11.

In a preferred variant embodiment, the internal volume of the lid 15 can be configured in an upper portion 15a and a lower portion 15b, insulated from each other.

The upper portion 15a is configured to house inside it a drive member 34 communicating toward the outside environment by means of an aperture 23.

The lower portion 15b is configured to house a secondary heating element 19 and possibly heat transfer and/or ventilation means 20 driven by the drive member 34.

The lower portion 15b communicates with the cooking chamber 16.

In another variant embodiment, the lid 15 can be provided with a second airtight packing disposed between the upper portion 15a and the lower portion 15b.

The second airtight packing can be suitably disposed in correspondence with the heat transfer and/or ventilation means 20, for example a ventilator, driven by the drive member 34, so that it determines a hydraulic seal in correspondence with the aperture 23, thus allowing the air to enter and at the same time preventing the steam from exiting from the cooking chamber 16.

The aperture 23 allows the air which cools the drive member 34 to enter.

According to a variant embodiment, the lid 15 comprises a pressure discharge device 25, selectively controllable and installed by way of example laterally to the lid 15, which comprises an aperture 26 with a selectively adjustable gap to control the pressure of the steam inside the container 11.

In the solution shown here, the gap is adjusted by means of a shutter element 27 that selectively opens and closes the aperture 26.

According to another variant embodiment, the container 11 can also comprise the pressure discharge device 25, as an alternative or in addition to the lid 15.

According to a variant embodiment, the transfer means 20 can cooperate with the pressure discharge means 25 to change the air inside the cooking chamber 16 and hence to make a higher or lower quantity of steam exit from it.

In a variant embodiment, not shown in the drawings, the apparatus 10 comprises a device to measure the temperature inside the container 11.

In another variant embodiment, not shown in the drawings, the apparatus 10 comprises a device to measure the pressure inside the cooking chamber 16.

In a variant embodiment, not shown in the drawings, the pressure discharge device 25 cooperates with the pressure measurer, in order to prevent the pressure from exceeding a desired value.

According to one embodiment, the container 11 can be configured to house inside it a grid or rack 35 or any other mean that allows to dispose the food in a raised position with respect to the base of the container 11 and the maximum level of the water.

According to a variant embodiment, the lid 15 can include means that carry signals such as for example signals of temperature, pressure or other, to a control and command unit 31 in the apparatus 10; the signals can be transmitted to the control and command unit 31 by way of example through the bracket 30.

If the lid 15 is such as to have the size coordinated with the container 11, by varying the container 11 in horizontal size, the lid 15 will be disconnected and reconnected to the bracket 30 together with the mechanical and electrical connection means present therein.

By varying the container 11 in height, the invention according to a variant provides two options.

In a first option the bracket 30 includes means to position attachment means 32 at the desired height.

A second option provides that the bracket 30 remains fixed, but the attachment means 32 are positioned along its extension.

By attachment means 32 we mean both mechanical connection and positioning means and also electric energy supply means and/or signal transmitters.

According to a variant embodiment, the lid 15 can include funnel means or container means to introduce water inside the cooking chamber 16, either at start of cooking or during cooking itself.

In this case, the lid 15 can include specific heating means. Moreover, the water can be heated in advance by the specific heating device or by the ambient temperature of the cooking chamber 16.

The support surface 24 of the base body 14 is a shape suitable to correctly cooperate with the specific shape of the base 12 of the container 11.

The base body 14 can comprise inside it an electric and electronic circuit for the control and command unit 31 and/or a drive member 33 and/or a main heating element 18 to generate the desired heat.

In another variant embodiment, the container 11 can comprise two handles 29 to facilitate maneuverability.

In another variant embodiment, not shown in the drawings, the container 11 can comprise a handle and/or a grip, for example with two positions (one open and one closed) so that it can be handled in the most varied manner.

The apparatus 10 comprises on the side facing toward the cooking chamber 16 at least a heating device 17 to allow to heat the water and the consequent production of steam, the heating device 17 comprises at least the main heating element 18 present in the base body 14.

The heating device 17 can comprise, also or only, the secondary heating element 19 present in the lid 15.

The secondary heating element 19 advantageously cooperates with the transfer means 20 to transmit the heat to the food and move the atmosphere in the cooking chamber 16.

In a variant embodiment, the mixing device 28 can be anchored either in correspondence with the base 12 of the container 11 (FIG. 2) or, according to another variant embodiment, in correspondence with the lid 15.

If the mixing device 28 is driven by the drive member 33 present in the base body 14, the connection thereof—which can be de-coupled—guarantees an airtight seal of the container 11.

The control and command unit 31 can be configured to selectively determine the opening or closing of the pressure discharge device 25.

In this way, the pressure discharge device 25 can be used to control not only the temperature and/or pressure values but also the degree of humidity inside the cooking chamber 16, so as to also allow recipes that do not include steam cooking to be carried out.

Furthermore, the control and command unit 31 can be configured to control and manage the mixing device 28 and/or the transfer means 20.

It is clear that modifications and/or additions of parts may be made to the apparatus 10 and method as described heretofore, without departing from the field and scope of the present invention.

The invention claimed is:

1. An Autonomous apparatus for cooking food, comprising:
    a base body (14) with a main heating element (18);
    a lid (15) which can be associated with the base body (14) in at least two positions and inside which a secondary heating element (19) is installed and possible heat transfer and/or ventilation means (20); and
    a mixing device (28),
    wherein the base body (14) supports and positions one of a removable container (11), said lid (15), and/or said container (11), in correspondence with a respective coupling edge, comprising at least an airtight packing (21) to define a cooking chamber (16) with a desired steam pressure, and
    wherein said lid (15) has a single size with airtight packings (21) suitable to cooperate with different sizes of the container (11) and/or of one container (11) having different heights with respect to said base body (14).

2. An autonomous apparatus for cooking food as in claim 1, wherein said lid (15) comprises a selectively controllable pressure discharge device (25).

3. An autonomous apparatus for cooking food as in claim 1, wherein said container (11) comprises a selectively controllable pressure discharge device (25).

4. An apparatus as in claim 1, wherein the container (11) has a grid or rack (35) inside it, able to dispose the food in a raised position with respect to a base of the container (11) and to a maximum level provided for the water.

5. An apparatus as in claim 1, wherein said heat transfer means (20) is associated with a drive member (34).

6. An apparatus as in claim 2, wherein said pressure discharge device (25) cooperates with a device to measure said pressure.

7. Apparatus as in claim 1, wherein said base body (14) has a control and command unit (31).

8. A method for cooking food with steam comprising the steps of: using the apparatus of claim 1;

supporting and positioning the container (11) with the lid (15) during a cooking phase;

generating in the container (11) an airtight cooking chamber (16) with a defined pressure;

selectively connecting during the cooking phase the cooking chamber (16) with an outside by means of a selectively controllable pressure discharge device (25).

9. The method as in claim 8, further comprising the step of determining with a control and command unit (31) the opening or closing of said selectively controllable pressure discharge device (25) based on the temperature and/or pressure values detected inside said cooking chamber (16).

10. The method as in claim 8, further comprising the step of selectively controlling said pressure discharge device (25) in order to maintain a correct degree of humidity inside said cooking chamber (16) even during different types of cooking other than steam cooking.

* * * * *